Jan. 9, 1940.  H. W. DIETERT  2,186,824
DEFORMATION AND RESILIENCE APPARATUS
Filed Dec. 13, 1937  2 Sheets-Sheet 1
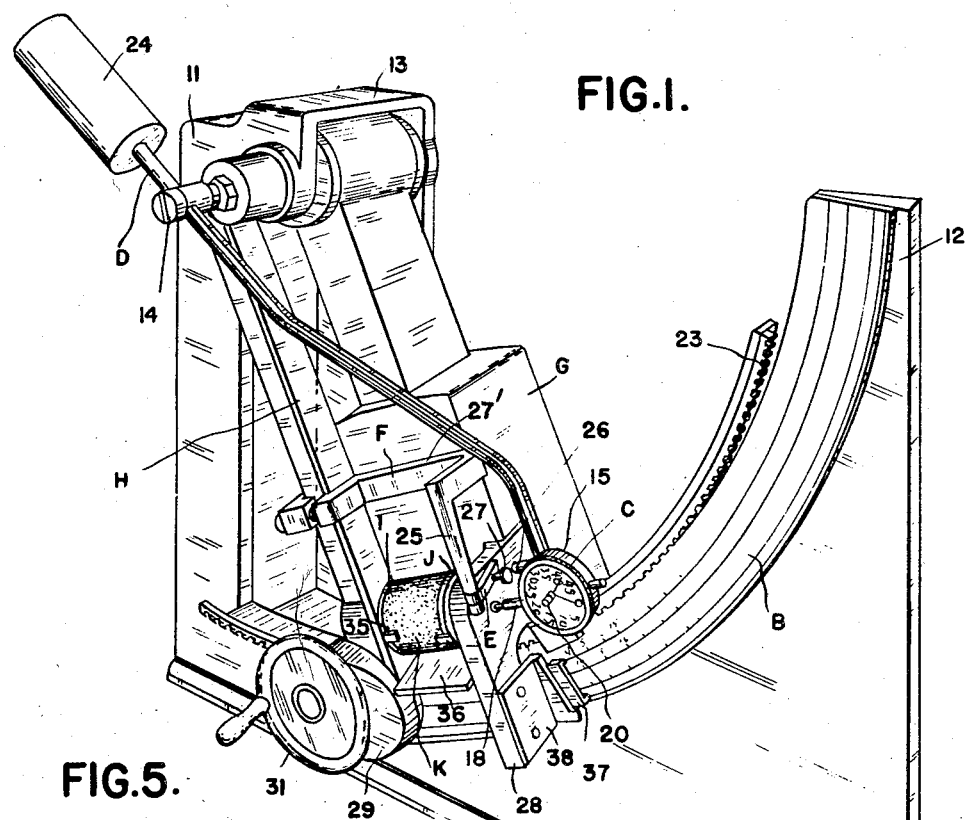
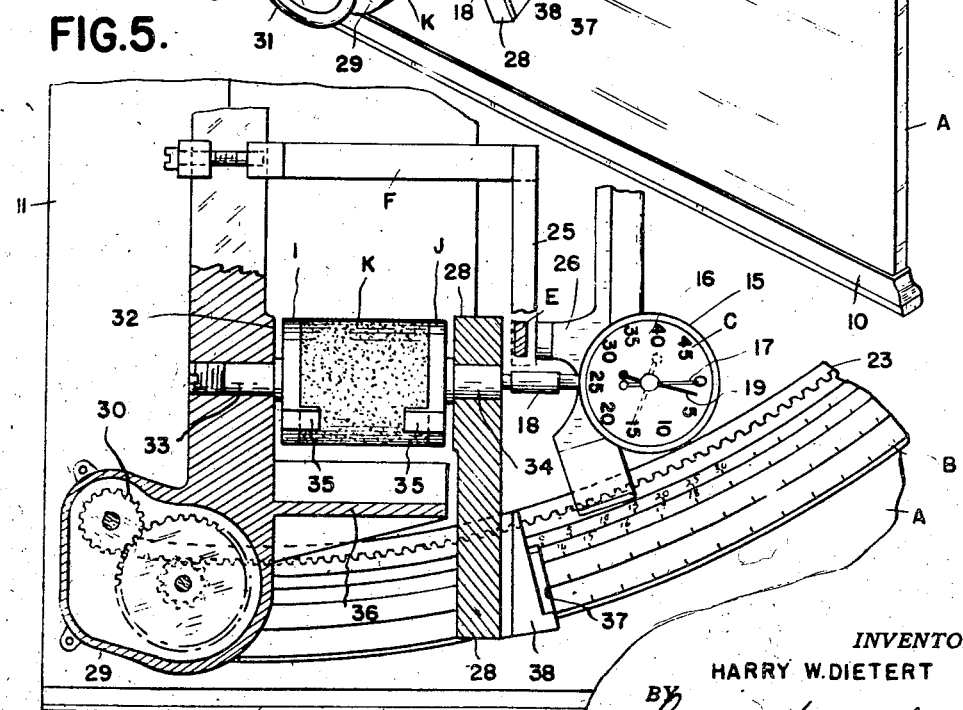
INVENTOR
HARRY W. DIETERT
ATTORNEYS Jan. 9, 1940.  H. W. DIETERT  2,186,824
DEFORMATION AND RESILIENCE APPARATUS
Filed Dec. 13, 1937  2 Sheets-Sheet 2

INVENTOR
HARRY W. DIETERT
BY
ATTORNEYS

Patented Jan. 9, 1940

2,186,824

UNITED STATES PATENT OFFICE 2,186,824

DEFORMATION AND RESILIENCE APPARATUS

Harry W. Dietert, Detroit, Mich.

Application December 13, 1937, Serial No. 179,590

27 Claims. (Cl. 265—12)

This invention relates generally to testing apparatus and refers more particularly to a machine for determining the workable strength of molding material and the like.

Molding sand, like other materials, may possess a satisfactory strength but the strength possessed is considerably limited due to a property which may be termed "deformation." For example, when a material is brittle, then its load carrying power is very limited. Molding sand may become "short" or "brittle" though the strength is satisfactory. A factor termed sand resilience or workable strength takes into consideration both the compression strength and deformation and this adds much to the green sand strength test.

Sand resilience indicates the amount of work required to break the same. It is calculated by multiplying the green compression strength reading by the reading of the deformation indicated.

In practice it is desirable to have molding material that will retain its body and ability to take a definite shape. However, it has been found that molding materials possess too much or not enough plasticity, and when they lack a sufficient amount of plasticity, molders experience trouble as the molding sand crumbles when sections of the mold are lifted from the pattern. When molding materials contain too much plasticity, i. e. when they contain too rich a mixture, they crack when subjected to the heat of the molten metal in the mold and cause inferior surfaces on the castings.

At the present time the bond strength of molding material is devaluated by strength tests such as compression, shear or tensile. However, such tests fail to completely devaluate the workable strength of the molding material, in that the plasticity, which is termed ductility in the case of metals, is not measured.

Therefore, it is an object of the present invention to obtain a measurement with plasticity of the molding material which forms the test specimen. Preferably this is accomplished by first forming a test specimen of molding material and then applying thereto a compressive load. By means of an indicator the amount the test specimen shortens or deforms under compressive load may be measured. Thus I determine the workable strength of molding materials by measuring the compressive load the specimen will support and the amount that specimen deforms or shortens under the load applied. The product of the compressive load and the amount the material deforms constitutes the workable strength of the material tested.

In the accompanying drawings

Fig. 1 is a perspective view of apparatus embodying my invention;

Fig. 5 is a sectional view taken substantially on line 5—5 of Fig. 3.

Figure 3:
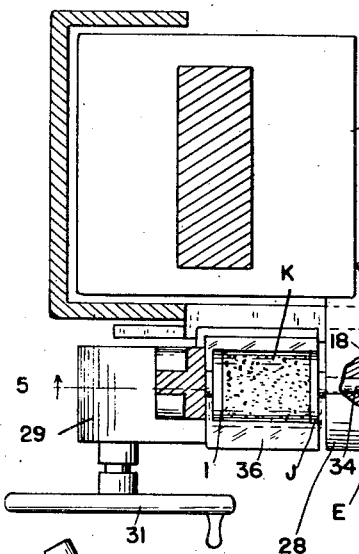
Fig. 3 is a sectional view taken substantially on line 3—3 of Fig. 2.
Figure 4:
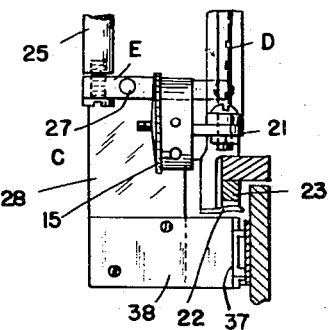
Fig. 4 is a sectional view taken substantially on line 4—4 of Fig. 2.

Referring now to the drawings wherein one embodiment of my invention is shown, A is the frame, B is the compression scale and C is the deformation indicator. D is the supporting arm for the indicator, E is an actuating lever for the indicator, and F is a supporting bracket for the lever. G is the swinging weight, H is the pusher arm, and I and J respectively are the compression heads for the molding material specimen.

As shown, the frame A has a base 10 and it is provided at opposite ends of said base with upstanding portions 11 and 12 respectively. Preferably the upstanding portion 12 is substantially triangular in configuration and carries the compression scale B, while the upstanding portion 11 is in the form of a channel shaped post having a closed upper end 13 and carries a shaft 14 constituting a common pivotal support for the weight G, pusher arm H and indicator arm D. The compression scale B is quadrant-like in configuration and is fixed to the triangular shaped upstanding portion 12 at the diagonal edge thereof.

The deformation indicator C has a casing 15 rigidly secured to the supporting arm D adjacent its lower end and is provided at one side of the casing with a dial 16, a pointer 17 movable over said dial and actuable by plunger 18, a hand 19 also movable over said dial and movable by the pointer 17, and a knurled finger piece 20 rigid with the hand 19 and adapted to return the same to its initial position.

The supporting arm D for the indicator C is bolted to a rearwardly extending stud 21 on the back of the indicator casing 15 and is provided below said studs 21 with a laterally extending leaf spring 22 for frictional engagement with a curved rack 23 on the upstanding portion 12 of the frame adjacent the upper edge of the scale B, and is preferably provided at its upper end beyond its pivot shaft 14 with a counterbalance weight 24.

The actuating lever E for the indicator C is pivoted at one end to a depending leg 25 of the bracket F and has its free end between the swinging weight G and a forward projection 26 of the supporting arm D for the indicator. A set screw 27 threadedly engages the lever E intermediate its ends and is engageable with the swinging weight G.

The bracket F is adjustably mounted on the pusher arm H and is provided at the upper end of the leg 25 with a laterally extending portion 27' that is substantially U-shaped in plan to afford proper clearance for positioning the molding material specimen K between the compression heads I and J.

The swinging weight G is pivoted at its upper end upon the shaft 14 and extends downwardly in rear of the scale B. Integral with this weight at its lower end is a laterally projecting wing 28 of inverted L configuration that extends over and in front of the scale B in rear of the indicator C.

The pusher arm H is also pivoted at its upper end upon the shaft 14 and extends downwardly in front of the scale B. At its lower end the pusher arm H has a housing 29 containing suitable reduction gearing 30 operable along the rack 23 by a hand wheel 31. As shown, this arm H is spaced laterally from the weight G and is provided near its lower end with a portion 32 substantially parallel to the wing 28.

The compression heads I and J are disk-like in configuration and have axially aligned pilots 33 and 34 respectively removably engaging the portion 32 and wing 28. Preferably these heads I and J are provided at their peripheries with opposed lugs 35 that cooperate with heads to hold the specimen K to be tested. Usually such specimen is approximately two inches long and is cylindrical in configuration.

36 is a shelf projecting at right angles from the arm H toward the wing 28 and serving as a spacer between the parts and has a tray for material of the specimen K after breakage thereof.

37 is a magnetic rider on the scale B and 38 is a bracket fixed to the adjacent face of the wing 28 for moving said rider over the scale in advance of the wing after the weight is pushed by the arm H upwardly along the scale B.

Figure 2:
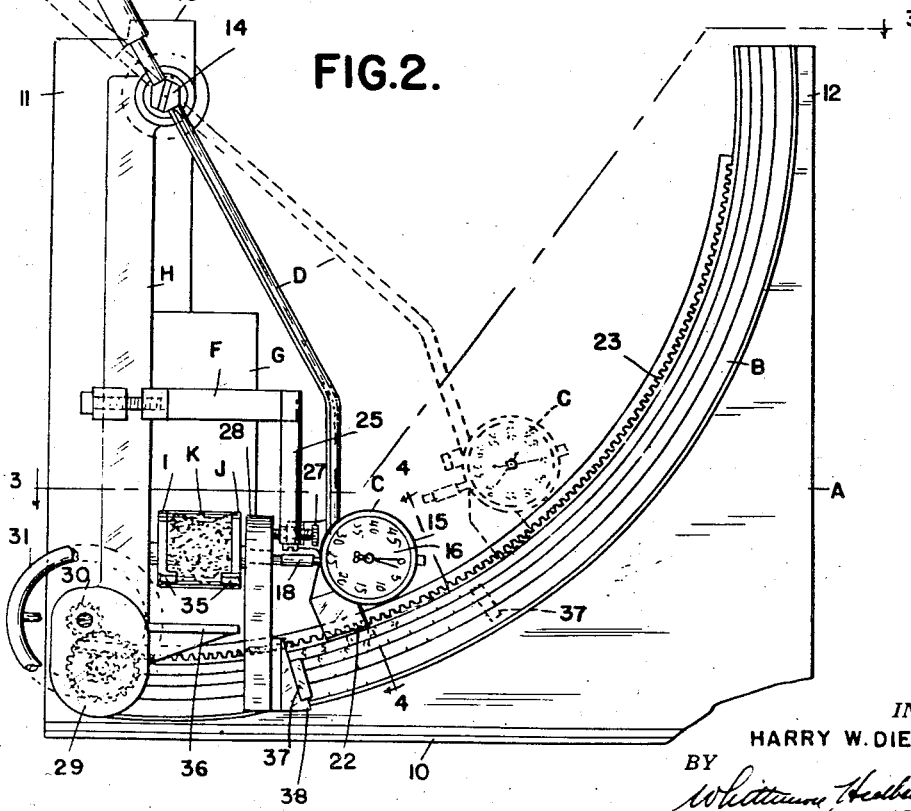
Fig. 2 is a fragmentary front elevation thereof with parts broken away in section and showing by dotted and full lines two positions of the indicator assembly.

In use, after a test specimen such as K has been placed between the heads I and J, the magnetic rider 37 has been placed against the bracket 38, and the projection 26 of the arm D and the plunger 18 of the indicator C have been moved downwardly against the lever E and compression head J respectively as illustrated by full lines in Fig. 2, the hand wheel 31 is turned to cause the pusher arm H to be moved by the gearing 30 along the rack 23 toward the upper end of the upstanding portion 12 of the frame. This movement of the arm H will be transmitted through the specimen K to the weight G, causing the latter to swing with the arm on the shaft 14 and cause the magnetic rider 37 to be pushed by the bracket 38 on the scale ahead of the wing 28 of the weight. As the weight G swings upwardly, it exerts a pressure on the specimen which varies with the effective torque arm. The increasing pressure compresses or deforms the specimen which causes the heads I and J to relatively approach each other as they are concurrently swung upwardly.

The lever E being pivoted about leg 25 and bearing against wing 28 by a set screw 27 is pivoted an amount depending upon the deformation of the specimen. As best seen in Fig. 3, projection 26 on arm D engages the lever E at a point substantially further from the pivot point of the lever E than is set screw 27. As a result, as the heads I and J approach each other the free end of lever E moves toward wing 28 an amount which may be equal to or any desired multiple of the deformation of the specimen K, depending upon the relative distance of the pivot axis of set screw 27 and the point of engagement of projection 26.

Arm D is spring retarded as above described and causes projection 26 to bear firmly against the lever E during upward movement of the assembly. As a result, the plunger 18 is pushed inwardly of casing C an amount equal to or any desired multiple of the deformation of specimen K. In addition the arrangement including lever E provides for immediate disengagement of both projection 26 and plunger 18 from lever E and wing 28, respectively, upon failure of the specimen. While actuating arm H may continue to move upwardly for an instant the outer or free end of lever E will instantly move in a downward direction and thus withdraw from projection 26. At this time casing C is retained in its furthermost upward position of displacement by spring 22, the pilot 34 of the compression head J will move inwardly the plunger 18 of the indicator, and the wing 28 will push the screw 27 carried by the lever E so that the free end of the lever will abut the forward projection 26 of the arm D and push the latter along the rack 23 ahead of the wing 28. As the plunger 18 moves inwardly, the mechanism (not shown) within the indicator casing 15 actuated thereby will cause the pointer 17 to move clockwise and in turn push the hand 19 therewith over the dial 16. Thus it will be appreciated that the compressive load placed on the test specimen K will cause the specimen to deform to the breaking or collapsing point, i. e. until the load on the specimen exceeds its strength. When this occurs, the weight G will fall by gravity away from the indicator C and magnetic rider 37, and the plunger 18 and pointer 17 of the indicator will return to their initial positions, but the maximum height to which said weight was moved by the specimen before collapsing will be recorded by the rider 37 which remains in its adjusted position, and the distance the pointer 17 was moved on the dial by the plunger 18 will be recorded by the hand 19 which also remains in its adjusted position. In this connection it will also be noted that the leaf spring 22 engaging the rack 23 will hold the indicator arm D in the position to which it was moved after the weight G falls due to collapse of the specimen. The deformation reading on the dial 16 of the indicator is then multiplied by the compression reading on the scale B to obtain the plasticity measurement or value desired. It will be understood that spring 22 loads arm D an amount just sufficient to insure correct reading of indicator C and to prevent arm D returning by gravity upon failure of the specimen which might disturb arm 19 or damage the instrument.

Thus from the foregoing it will be apparent that the measure of plasticity or moldability of the specimen is based upon the amount the test specimen deforms under a load. In practice the lever E permits the pointer 17 of the indicator to stop clockwise movement when the weight falls suddenly due to the collapsing of the specimen. By having the pointer 17 of the indicator actuable by pushing action of the head J carried by the weight G, the amount specimen K deforms will be accurately recorded because the plunger 18 will be moved inwardly by said head J from the moment the specimen K starts to deform due to the load of the weight G until it collapses. Adjustment of the screw 27 carried by the lever E will of course alter the reading on the dial 16. For example, after the test specimen K has been placed between the heads I and J and the indicator assembly has been moved toward the wing 28 as aforesaid, the screw 27 may be adjusted to move the indicator arm D and indicator C carried thereby relative to the wing 28 so that the displacement by the head J of the plunger 18 will be varied accordingly, and may be adjusted to give a zero reading of indicator C. Thus it will be apparent that the action of the plunger 18 of the indicator is under the control of the lever E.

What I claim as my invention is:

1. In a testing apparatus, a shaft, a scale substantially concentric with said shaft, a weight suspended from said shaft, a pusher arm for the weight suspended from said shaft, means carried by said arm and weight for holding a test specimen, means for actuating said arm to transmit motion through said specimen to said weight, means for indicating the deformation of said specimen, and means actuable by said weight over said scale to determine the compressive strength of said specimen.

2. In a testing apparatus, a shaft, a weight suspended from said shaft, a pusher arm for the weight suspended from said shaft, means carried by said arm and weight for holding a test specimen, means for actuating said arm to transmit motion through said specimen to said weight, an indicator suspended from said shaft in advance of said weight and having a dial, a pointer movable over said dial, and a hand movable by said pointer over said dial, means for transmitting motion from the weight to the indicator including a lever carried by the pusher arm, and means for transmitting motion from the weight to the pointer to measure the deformation of said specimen during movement aforesaid of the pusher arm.

3. In a testing apparatus, a shaft, a scale substantially concentric with said shaft, a rack extending along said scale, a weight suspended from said shaft, a pusher arm for the weight suspended from said shaft, means carried by said arm and weight for holding a test specimen, means including gearing carried by said arm and engaging said rack for actuating said arm to transmit motion through said specimen to said weight, and means actuable by said weight over said scale to determine the compressive strength from said specimen.

4. In a testing apparatus, a shaft, a weight suspended from said shaft, a pusher arm for the weight suspended from said shaft, means carried by said arm and weight for holding a test specimen, means for actuating said arm to transmit motion through said specimen to said weight, an indicator arm suspended from said shaft in advance of said weight, an indicator carried by said arm and having a dial, a pointer movable over said dial and a hand movable by said pointer over said dial, means for transmitting motion from the weight to the indicator including a lever carried by the pusher arm and engaging said indicator arm, and an adjustable element carried by the lever and engaging said weight, and means under the control of the lever and adjustable element for transmitting motion from the weight to the pointer to measure the deformation of said specimen during movement aforesaid of the pusher arm.

5. In a testing apparatus, a shaft, a weight suspended from said shaft, a pusher arm for the weight suspended from said shaft, means carried by said arm and weight for holding a test specimen, means for actuating said arm to transmit motion through said specimen to said weight, an indicator arm suspended from said shaft in advance of said weight, an indicator carried by said arm and having a dial, a pointer movable over said dial and a hand movable by said pointer over said dial, means for transmitting motion from the weight to the indicator including a lever carried by the pusher arm and engaging said indicator arm, an adjustable element carried by the lever and engaging said weight, and means operable when the specimen collapses for holding the indicator in the position to which it was moved by said lever.

6. A device of the class described having a swinging weight, a pusher arm, means between and subject to the compressive action of said pusher arm and weight for holding a test specimen, an indicator assembly in advance of the weight for measuring the deformation of the specimen being tested, said indicator assembly having a casing, a plunger projecting from the casing and actuable by the weight, a dial, a pointer movable over the dial by said plunger, and a hand movable over said dial by the pointer, a bracket carried by the pusher arm, a lever fulcrumed at one end upon the bracket and extending between the weight and indicator assembly, the free end of said lever being engageable with said assembly, and an adjustable element carried by the lever intermediate its ends and engageable with said weight.

7. A device of the class described having means for holding a specimen to be tested, means for actuating the holding means to subject the specimen for a compressive load, an indicator assembly operable while the specimen is subjected to said compressive load for recording the deformation of the specimen, said indicator assembly having a casing, a plunger projecting from the casing and actuable by the specimen holding means, a dial, a pointer movable over the dial and actuable by the plunger, and a hand movable over the dial and actuable by the pointer, and means controlling the action of the hand including a lever fulcrumed at one end and having its free end engageable with the indicator assembly, and a member carried by the lever intermediate its ends and actuable by said specimen holding means, the arrangement being such that the movement of the indicator hand is reverse to the movement of the specimen holding means.

8. In a testing apparatus, a pair of relatively movable heads, a bracket rigidly carried by one of said heads, a lever fulcrumed on said bracket and operatively associated with said other head, an indicator comprising relatively movable elements, one of said elements being movable with said first specified head, and said other element being movable with said lever at a predetermined distance from its fulcrum.

9. In a testing apparatus, a pair of relatively movable heads, a bracket rigidly carried by one of said heads, a lever fulcrumed on said bracket and operatively associated with said other head, an adjustable abutment at a predetermined distance from the fulcrum of said lever between said other head and said lever, an indicator comprising relatively movable elements, one of said elements being movable with said first specified head, and said other element being movable with said lever at a predetermined distance from its fulcrum.

10. In a testing apparatus, a pair of relatively movable heads, a bracket rigidly carried by one of said heads, a lever fulcrumed on said bracket and operatively associated with said other head, an adjustable abutment carried by said lever at a predetermined distance from the fulcrum of said lever and engaging said other head, an indicator comprising relatively movable elements, one of said elements being movable with said first specified head, and said other element being movable with said lever at a predetermined distance from its fulcrum, said predetermined distances being different.

11. In a testing device, a frame, an arcuate rack, a shaft concentric with said rack, a weighted arm and an actuating arm pivoted to said shaft, means on said arms for retaining a specimen to be tested therebetween, a graduated scale along said rack, and driving mechanism comprising a pinion carried by said actuating arm and meshing with said rack.

12. In a testing device, a frame, an arcuate rack, a shaft concentric with said rack, a weighted arm and an actuating arm pivoted to said shaft, means on said arms for retaining a specimen to be tested therebetween, a graduated scale along said rack, a marker movable along said scale and engaged by one of said arms, said marker adapted to remain in its farthest position of displacement, and driving mechanism comprising a pinion carried by said actuating arm and meshing with said rack.

13. In a testing device, a frame, an arcuate rack, a shaft concentric with said rack, a weighted arm and an actuating arm pivoted to said shaft, means on said arms for retaining a specimen to be tested therebetween, a deformation indicator comprising relatively movable elements, a support for said indicator pivoted about said shaft, one of said elements engaging and movable with one of said arms, and means for moving said other element relatively of said first element in accordance with relative movement of said arms.

14. In a testing device, a frame, an arcuate rack, a shaft concentric with said rack, a weighted arm and an actuating arm pivoted to said shaft, means on said arms for retaining a specimen to be tested therebetween, a deformation recording indicator movable along said rack and engaging one of said arms, and resistance means for retaining said indicator in any position upon disengagement to prevent disturbance of said indicator.

15. Means for determining the workable strength of moldable material comprising a weighted arm, an actuating arm, means for supporting a specimen between said arms, said arms being independently movable about the same axis, the arrangement being such that said actuating arm moves said weighted arm through said specimen, an indicator comprising relatively movable elements, said indicator being movable as a unit in accordance with concurrent movement of said arms, and said elements being relatively movable in accordance with relative movement of said arms.

16. Means for determining the workable strength of moldable material comprising a weighted arm, an actuating arm, means for supporting a specimen between said arms, said arms being independently movable about the same axis, the arrangement being such that said actuating arm moves said weighted arm through said specimen, an indicator comprising relatively movable elements, said indicator being movable as a unit in accordance with concurrent movement of said arms, and said elements being relatively movable in accordance with relative movement of said arms, and means effective upon failure of said specimen for reversing said relative movement of said elements, said last means comprising a resistance element for retaining said indicator in the position it occupied on failure of said specimen.

17. Means for determining the workable strength of moldable material comprising a weighted arm, an actuating arm, means for supporting a specimen between said arms, said arms being independently movable about the same axis, the arrangement being such that said actuating arm moves said weighted arm through said specimen, whereby the force exerted between said arms is a function of the arc through which said weighted arm is swung upwardly, a scale concentric with said axis, a recording indicator movable along said scale by said weighted arm, a recording deformation indicator movable by said arms, and adapted to indicate and record the maximum relative movement of said arms prior to failure of said specimen.

18. Means for determining the workable strength of moldable material comprising a weighted arm, an actuating arm, means for supporting a specimen between said arms, said arms being independently movable about the same axis, the arrangement being such that said actuating arm moves said weighted arm through said specimen, whereby the force exerted between said arms is a function of the arc through which said weighted arm is swung upwardly, a scale concentric with said axis, a recording indicator movable along said scale by said weighted arm, a recording deformation indicator movable by said arms and adapted to indicate and record the maximum relative movement of said arms prior to failure of said specimen and means effective upon failure of said specimen to interrupt operation of said indicator.

19. Means for determining the workable strength of moldable material comprising a weighted arm, an actuating arm, means for supporting a specimen between said arms, said arms being independently movable about the same axis, the arrangement being such that said actuating arm moves said weighted arm through said specimen, whereby the force exerted between said arms is a function of the arc through which said weighted arm is swung upwardly, a scale concentric with said axis, a recording indicator movable along said scale by said weighted arm, a recording deformation indicator movable by said arms and adapted to indicate and record the maximum relative movement of said arms prior to failure of said specimen and means effective upon failure of said specimen to interrupt operation of said deformation indicator, said means comprising a resistance element for retaining said deformation indicator in position as said weighted arm swings away therefrom.

20. Means for determining the workable strength of moldable material comprising a weighted arm, an actuating arm, means for supporting a specimen between said arms, said arms being independently movable about the same axis, the arrangement being such that said actuating arm moves said weighted arm through said specimen, whereby the force exerted between said arms is a function of the arc through which said weighted arm is swung upwardly, an indicator comprising relatively movable elements, one of said elements being movable with said weighted arm as it swings upwardly, means for moving said other element comprising a part movable toward said weighted arm upon approach of said arms.

21. Means for determining the workable strength of moldable material comprising a weighted arm, an actuating arm, means for supporting a specimen between said arms, said arms being independently movable about the same axis, the arrangement being such that said actuating arm moves said weighted arm through said specimen, whereby the force exerted between said arms is a function of the arc through which said weighted arm is swung upwardly, an indicator comprising relatively movable elements, one of said elements being movable with said weighted arm as it swings upwardly, means for moving said other element comprising a lever pivotally supported from said actuating arm and engaging said weighted arm, the relationship between the pivot point of said lever, the engagement between said lever and said weighted arm, and the engagement between said lever and said other element being such that upon sudden movement of said weighted arm toward said actuating arm, said other element moves outwardly from said first mentioned element.

22. In an indicator, a pair of relatively movable specimen supporting heads, a deformation indicator comprising a casing movable as a unit toward said heads, means for relatively moving said casing and said heads toward each other in accordance with relative movement between said heads, and an indicator actuator element engaging and movable with one of said heads.

23. A testing device comprising a frame, an actuating arm and a weighted arm independently pivoted about the same axis, heads on said arms for receiving a specimen therebetween, means for swinging said actuating arm and for swinging said weighted arm by the force transmitted thereto from said actuating arm through said specimen, a direct reading, maximum recording indicator movable in an arc with said specimen, and means associated with said indicator and said heads for actuating said indicator to indicate deformation of said specimen, said last means arranged so that upon failure of said specimen, said indicator is instantly disengaged from said means, whereby said indicator records maximum deformation prior to failure of said specimen.

24. A testing device comprising a frame, an actuating arm and a weighted arm independently pivoted about the same axis, heads on said arms for receiving a specimen therebetween, means for swinging said actuating arm and for swinging said weighted arm by the force transmitted thereto from said actuating arm through said specimen, a direct reading indicator pivoted concentrically with said arms and movable in an arc with and by said heads, resistance means opposing swinging movement of said indicator and effective to cause said indicator to remain in cooperating relation with said heads and to retain said indicator in the position of maximum displacement upon failure of said specimen, and means associated with said heads and said indicator to actuate said indicator to indicate deformation of said specimen.

25. In a testing apparatus, a pair of relatively movable heads, a pivotally mounted lever carried by one of said heads, an adjustable abutment carried by the lever in spaced relation to the pivot of said lever and normally contacting said other head, means biasing said lever toward said other head, whereby said lever is pivoted in accordance with relative movement of said heads, and means for measuring pivotal movement of said lever.

26. A device of the class described having relatively movable heads for holding a specimen to be tested, means for actuating the heads to subject the specimen to a compressive load, an indicator assembly operable while the specimen is subjected to said compressive load for recording the deformation of the specimen, said indicator assembly having a casing, a plunger projecting from the casing, a dial, a pointer movable over the dial and actuable by the plunger, and a hand movable over the dial and actuable by the pointer, and a lever carried by one head and pivoted thereto and having a portion abutting the indicator casing, said lever being actuable by the other head to pivot said lever, said plunger directly engaging said other head.

27. In a testing apparatus, a pair of relatively movable heads, a movable arm having a portion adjacent one of said heads, a pivotally mounted lever carried by the other of said heads and extending between the first mentioned head and portion aforesaid of said arm, an adjustable abutment carried by the lever in spaced relation to the pivot of said lever and bearing against the first mentioned head, means biasing said lever toward the first mentioned head whereby said lever is pivoted in accordance with relative movement of said heads, and means carried by the portion aforesaid of said arm for measuring pivotal movement of said lever.

HARRY W. DIETERT.